(12) United States Patent
Chang et al.

(10) Patent No.: US 10,218,057 B2
(45) Date of Patent: Feb. 26, 2019

(54) COMMUNICATION DEVICE USING INTERNAL COMPONENTS OF DEVICE AS RADIO ANTENNA

(71) Applicant: HON HAI PRECISION INDUSTRY CO., LTD., New Taipei (TW)

(72) Inventors: Hao-Ying Chang, New Taipei (TW); Pai-Cheng Huang, New Taipei (TW); Ching-Sung Wang, New Taipei (TW); Chao-Wei Ho, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 85 days.

(21) Appl. No.: 15/364,366

(22) Filed: Nov. 30, 2016

(65) Prior Publication Data
US 2017/0194697 A1  Jul. 6, 2017

(30) Foreign Application Priority Data
Dec. 31, 2015  (TW) .............................. 104144803 A

(51) Int. Cl.
| | | |
|---|---|---|
| *H04N 5/225* | (2006.01) | |
| *H01Q 1/24* | (2006.01) | |
| *H01Q 1/22* | (2006.01) | |
| *H01Q 1/38* | (2006.01) | |
| *H01Q 1/48* | (2006.01) | |
| *H01Q 1/52* | (2006.01) | |
| *H04M 1/02* | (2006.01) | |

(52) U.S. Cl.
CPC ........... *H01Q 1/243* (2013.01); *H01Q 1/2291* (2013.01); *H01Q 1/38* (2013.01); *H01Q 1/48* (2013.01); *H01Q 1/526* (2013.01); *H04M 1/0264* (2013.01); *H04M 1/026* (2013.01); *H04M 2250/52* (2013.01)

(58) Field of Classification Search
CPC .. H04B 7/0617; H04B 7/0408; H04B 1/3838; H04B 1/3833; H04W 16/28; H04W 16/24; H01Q 1/246; H01Q 1/245; H01Q 1/242; H01Q 1/243; H01Q 1/244
See application file for complete search history.

(56) References Cited

U.S. PATENT DOCUMENTS

| | | | | |
|---|---|---|---|---|
| 9,608,327 B1* | 3/2017 | Tai | ........................... | H01Q 7/06 |
| 2001/0011894 A1* | 8/2001 | Havey | ................... | G01V 3/088 |
| | | | | 324/662 |
| 2007/0109196 A1* | 5/2007 | Tang | ..................... | H01Q 1/243 |
| | | | | 343/700 MS |
| 2008/0268925 A1* | 10/2008 | Tang | .................... | H01Q 1/2258 |
| | | | | 455/575.7 |

(Continued)

FOREIGN PATENT DOCUMENTS

WO  WO 2015167514 A1 * 11/2015 ........... H04B 1/3838

*Primary Examiner* — Chia Wei A Chen
(74) *Attorney, Agent, or Firm* — ScienBiziP, P.C.

(57) ABSTRACT

The communication device includes a circuit board and a camera mechanism comprising a metal shielding and a camera module positioned on the circuit board. The metal shielding is arranged on the circuit board to cover the camera module and an antenna mechanism is arranged on the metal shielding and electrically connected to a ground region of the circuit board through the metal shielding. A wireless signal generated by the camera module is output by the antenna mechanism and radiates outward from the metal shielding.

16 Claims, 5 Drawing Sheets

(56) References Cited

U.S. PATENT DOCUMENTS

| | | | |
|---|---|---|---|
| 2010/0234066 A1* | 9/2010 | Kobayashi | H01Q 1/243 |
| | | | 455/556.1 |
| 2012/0140107 A1* | 6/2012 | Anderson | G03B 17/02 |
| | | | 348/341 |
| 2013/0050536 A1* | 2/2013 | Suzuki | H04N 13/0239 |
| | | | 348/240.3 |
| 2013/0135165 A1* | 5/2013 | Yamaguchi | H01Q 7/06 |
| | | | 343/788 |
| 2013/0322862 A1* | 12/2013 | Hsu | G02B 7/285 |
| | | | 396/125 |
| 2014/0049636 A1* | 2/2014 | O'Donnell | G08C 17/02 |
| | | | 348/143 |
| 2014/0111684 A1* | 4/2014 | Corbin | H01Q 1/243 |
| | | | 348/374 |
| 2014/0233907 A1* | 8/2014 | Anderson | H04N 5/44513 |
| | | | 386/225 |
| 2015/0244063 A1* | 8/2015 | Sowpati | H01Q 1/243 |
| | | | 343/702 |
| 2016/0134793 A1* | 5/2016 | Samanta | H04N 5/23216 |
| | | | 348/222.1 |
| 2016/0234444 A1* | 8/2016 | Hosono | G03B 15/00 |
| 2016/0263884 A1* | 9/2016 | Nakamura | G03G 15/5075 |
| 2017/0353590 A1* | 12/2017 | Shen | H04M 1/0202 |

* cited by examiner

COMMUNICATION DEVICE USING INTERNAL COMPONENTS OF DEVICE AS RADIO ANTENNA

CROSS-REFERENCE TO RELATED APPLICATIONS

This application claims priority to Taiwanese Patent Application No. 104144804 filed on Dec. 31, 2015, the contents of which are incorporated by reference herein.

FIELD

The subject matter herein generally relates to wireless communications.

BACKGROUND

A communication device may include an image or video capturing system for recording/capturing video or images and sharing or transferring images or video with another communication device. The communication device may include an antenna, a wireless communication mechanism, and two lenses for recording/capturing images or video. The two lenses are configured for capturing/recording images stereoscopically. When the antenna and the two lenses are positioned to be adjacent to each other, a radiation efficiency of the antenna is affected by metal supports of the two lenses. Conversely, if the two lenses and the antenna are positioned away from each other, valuable space in the communication device for other components is reduced.

BRIEF DESCRIPTION OF THE DRAWINGS

Implementations of the present technology will now be described, by way of example only, with reference to the attached figures.

DETAILED DESCRIPTION

Figure 1:
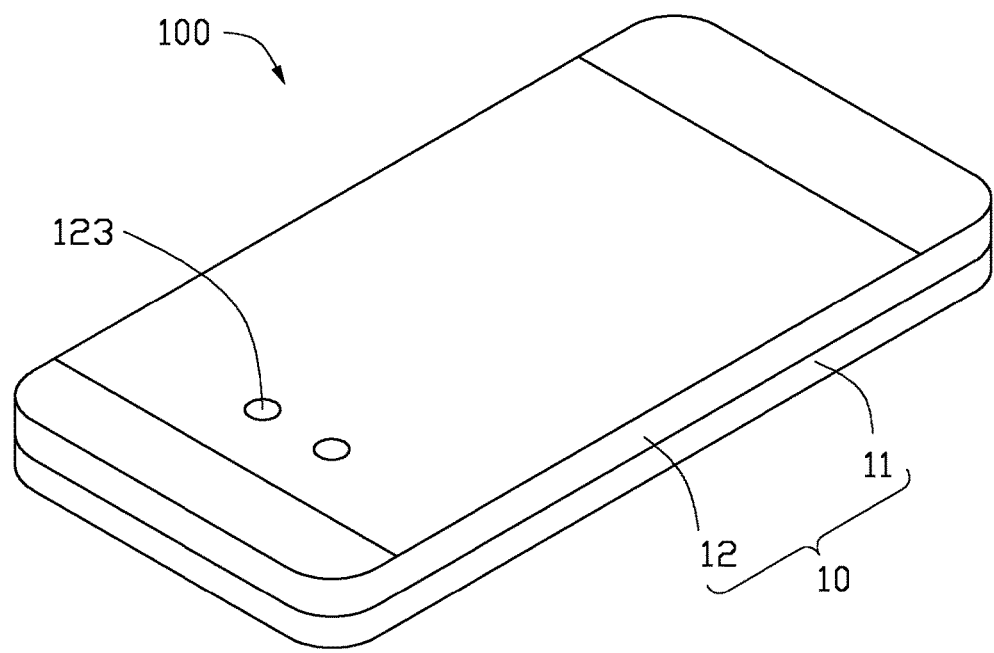
FIG. 1 is an isometric view of an exemplary embodiment of a communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a communication device. The communication device comprises a circuit board and a camera mechanism comprising a metal shielding and a camera module arranged on the circuit board. The metal shielding is arranged on the circuit board to cover the camera module. An antenna mechanism is arranged on the metal shielding and electrically connected to a ground region of the circuit board through the metal shielding.

Figure 2:
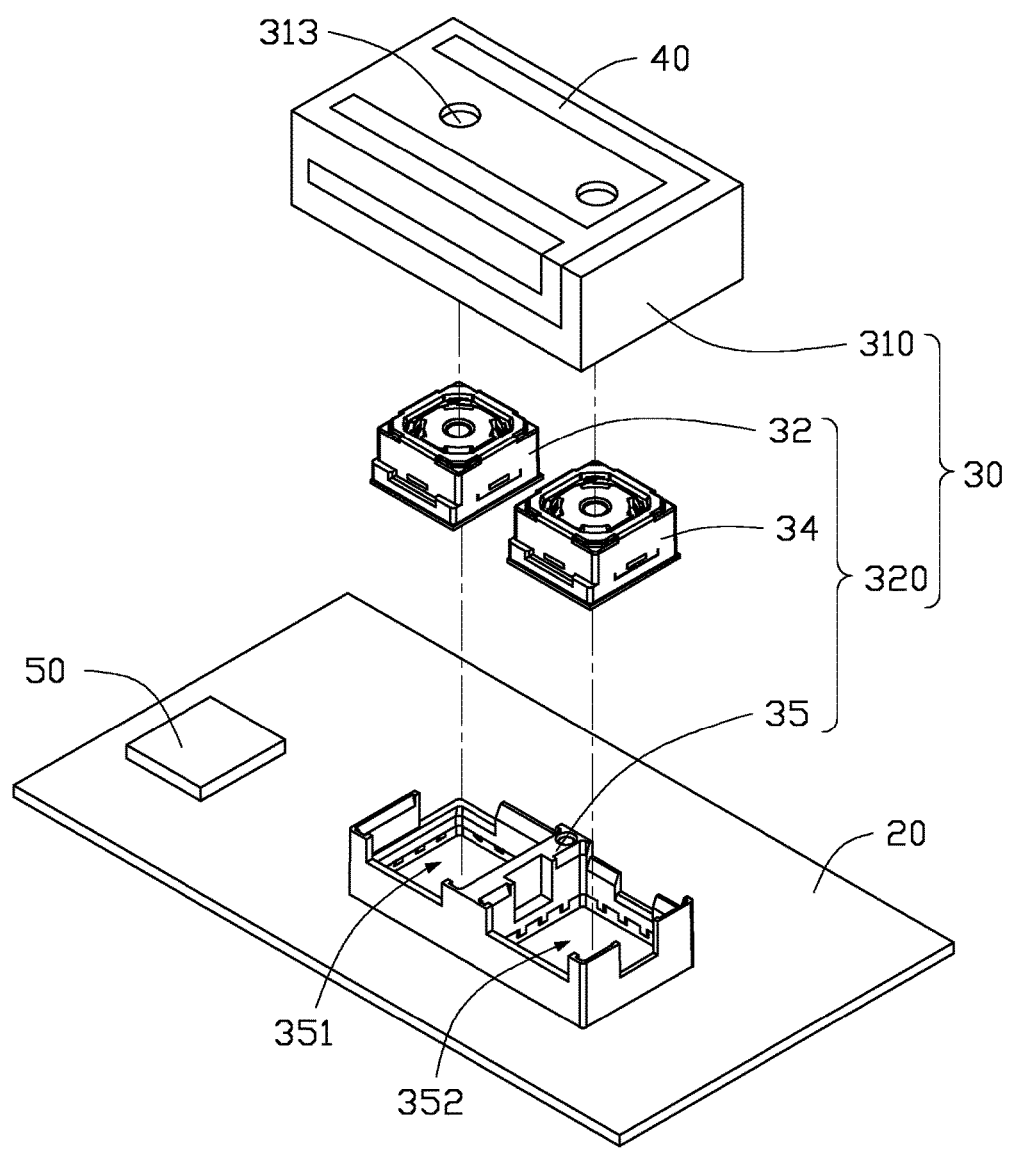
FIG. 2 is an exploded view of a portion of the communication device shown in FIG. 1.
Figure 3:
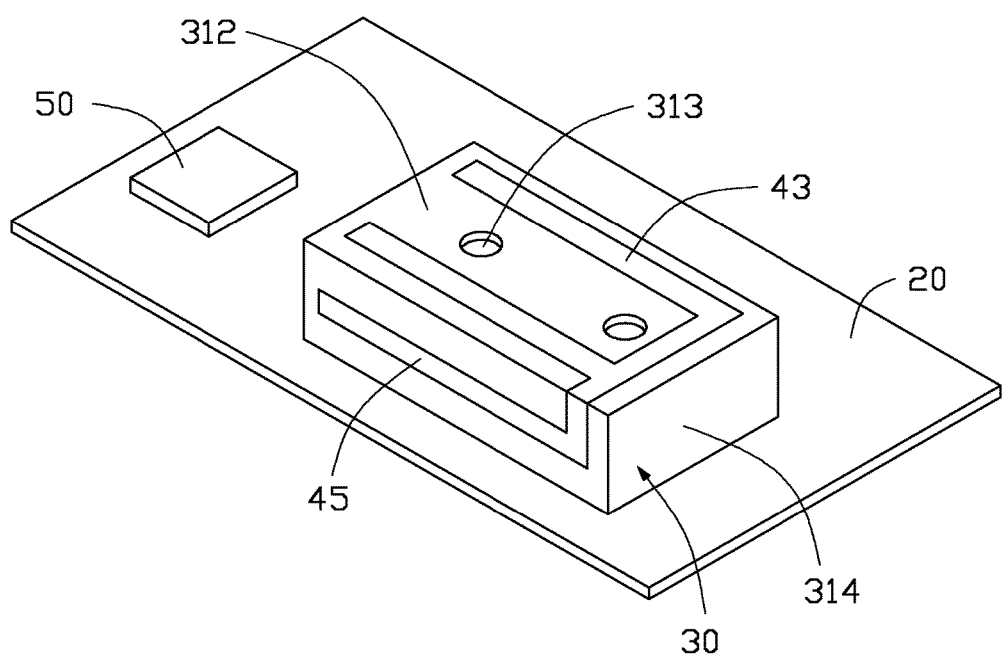
FIG. 3 is an assembled view of the portion of the communication device shown in FIG. 2

FIGS. 1 to 3 illustrate an exemplary embodiment of a communication device 100 of a first exemplary embodiment. The communication device 100 includes a case 10, a circuit board 20, a camera mechanism 30, an antenna mechanism 40, and a wireless communication mechanism 50. The printed board 20, the camera mechanism 30, the antenna mechanism 40, and the wireless communication mechanism 50 are positioned in the case 10. The camera mechanism 30 and the wireless communication mechanism 50 are arranged on and electrically connected to the circuit board 20. The camera mechanism 30 is partly exposed from the case 10 (as shown in FIG. 3). The communication device 100 can be a portable electronic such as a mobile phone or a tablet. In one exemplary embodiment, the communication device 100 is a mobile phone.

The case 10 is substantially rectangular. The case 10 includes an upper shell 11 and a lower shell 12. The upper shell 11 clamps and mounts to the lower shell 12. The upper shell 11 and the lower shell 12 joining together to form an enclosed space. The circuit board 20, the camera mechanism 30, the antenna mechanism 40, and the wireless communication mechanism 50 are positioned in the enclosed space. At least one first opening 123 is defined in the lower shell 12. In an exemplary embodiment, there are two first openings 123. In an exemplary embodiment, the case 10 forms a body of the communication device 100. The upper shell 11 can be a transparent cover plate. The lower shell 12 can be a back plate of the communication device 100. The upper shell 11 and the lower shell 12 can be mounted together by screws. The communication device 100 can further include other elements for operation of the communication device, such as a processor, a memory, a battery, a speaker, and the like.

The circuit board 20 is substantially a flat plate. The circuit board 20 provides electrical signals to the camera mechanism 30, the antenna mechanism 40, and the wireless communication mechanism 50.

FIG. 3 illustrates an exemplary arrangement of the camera mechanism 30 on the circuit board 20 and electrically connected to the circuit board 20. The camera mechanism 30 includes a metal shielding 310 and a camera module 320.

The metal shielding 310 is arranged on the circuit board 20 and covers the camera module 320 to shield against electromagnetic radiation produced from the camera module 320. In one exemplary embodiment, the metal shielding 310 includes a first surface 312 and a plurality of side surfaces 314. The first surface 312 and the side surfaces 314 of the metal shielding 310 together form a receiving space to receive the camera module 320. At least one second opening 313 is defined in the first surface 312, and each second opening 313 is adjacent to one first opening 123. The plurality of side surfaces 314 perpendicularly extend from the four edges of the first surface 312. In one exemplary embodiment, two second openings 313 are defined in the first surface 312.

In one exemplary embodiment, the camera module 320 is a double lens camera module, and includes a first camera 32, a second camera 34, and a first frame 35. In one exemplary embodiment, an optical axis of the first camera 32 and an optical axis of the second camera 34 are parallel to each other. A portion of the first camera 32 and the second camera 34 can be exposed from the second opening 133 and the first opening 123. Both the first camera 32 and the second camera 34 can switch between photographic mode and video mode. When the first camera 32 and the second camera 34 are in the photographic mode, the first camera 32 and the second camera 34 are configured to capture still images. When the first camera 32 and the second camera 34 are in the video mode, the first camera 32 and the second camera 34 are configured to record movement, videos, and the like. In one exemplary embodiment, the first camera 32 and the second camera 34 can be in photographic mode at the same time to capture stereoscopic images. In another exemplary embodiment, the first camera 32 and the second camera 34 can be in different modes. For example, the first camera 32 can be in a photographic mode and the second camera 34 can be in a video mode. Alternatively, the first camera 32 can in a video mode and the second camera 34 can in photographic mode to capture still images and moving pictures at a same time. In one exemplary embodiment, the first camera 32 and the second camera 34 can have different focal lengths. In other exemplary embodiment, the first camera 32 and the second camera 34 can have a same focal length adjustment range. In one exemplary embodiment, at least one of the first camera 32 and the second camera 34 can rotate to adjust an angle between the optical axis of the first camera 32 and the circuit board 20.

The first frame 35 is electrically connected to a ground region of the circuit board 20. A first cavity 351 and a second cavity 352 are defined in the first frame 35 defines. The first cavity 351 receives the first camera 32. The second cavity 352 receives the second camera 34. In one exemplary embodiment, the first frame 35 is made of metal. In one exemplary embodiment, at least one clamping bump (not shown) is defined on an inner surface of the first frame 35. In other exemplary embodiment, the inner surface of the first frame 35 is substantially stepped to support the first camera 32 and the second camera 34 in line.

The antenna mechanism 40 is planar and is arranged on the metal shielding 310. Further, the antenna mechanism 40 is arranged on the first surface 312 and at least one side surface 314. The antenna mechanism 40 is electrically connected to the ground region of the circuit board 20 through the metal shielding 310. In one exemplary embodiment, the antenna mechanism 40 is directly in contact with and electrically connected to the ground region of the circuit board 20. The antenna mechanism 40 includes a first antenna 43 and a second antenna 45 electrically connected to the first antenna 43. The first antenna 43 is arranged on the first surface 312. The second antenna 45 is arranged on one side surface 314 adjacent to the first surface 312. In one exemplary embodiment, the first antenna 43 is substantially U-shaped, and the second antenna 45 is substantially L-shaped. In other exemplary embodiments, the first antenna 43 and the second antenna 45 can be other shapes, such as Z-shape, square shape, and so on.

The wireless communication mechanism 50 is located on the circuit board 20 and is adjacent to the camera mechanism 30. The wireless communication mechanism 50 is configured to communicate wirelessly with another communication device. In one exemplary embodiment, the wireless mechanism 50 can be a WIFI transceiver or a fourth-generation (4G) transceiver.

Figure 4:
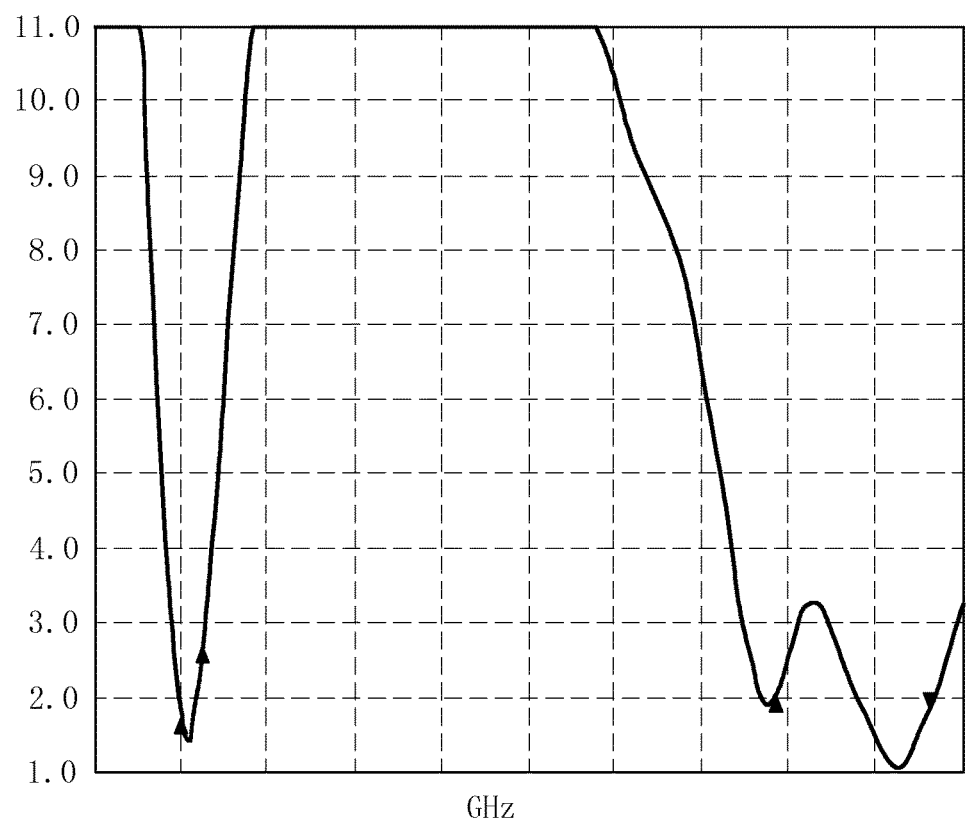
FIG. 4 is a diagram of a waveform of voltage standing wave ratio of the communication device of FIG. 1.

FIG. 4 illustrates an exemplary embodiment of waveforms of transmission frequency (TF) and voltage standing wave ratio (VSWR) of the communication device 100. When the TF is 2.4 GHz, the VSWR is 1.75. At TF of 2.5 GHz, the VSWR is 2.7044 and at TF of 5.15 GHz, the VSWR is 2.0339. When the TF is 5.85 GHz, the VSWR is 1.805. Table 1-1 illustrates a relation between transmission frequency and gain of the communication device 100, with the antenna mechanism 40 covering the metal shielding 310.

TABLE 1-1

| relation between transmission frequency and gain: | | | | | |
|---|---|---|---|---|---|
| transmission frequency (MHz) | 2412 | 2447 | 2472 | 5150 | 5500 | 5850 |
| Gain(dBm) | −5.3 | −4.85 | −4.79 | −4.93 | −3.95 | −3.51 |

Figure 5:
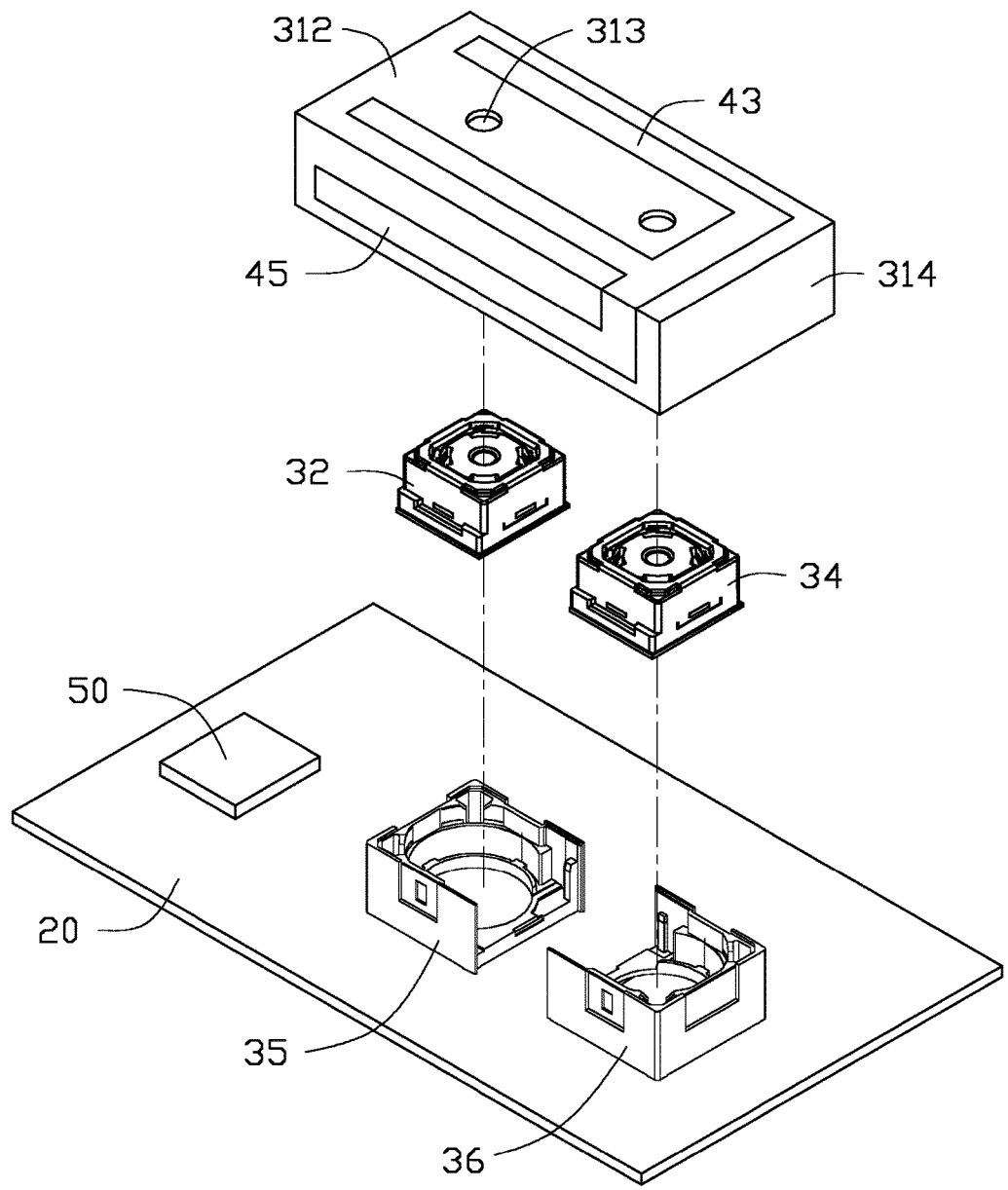
FIG. 5 is an exploded view of a second exemplary embodiment of a portion of a communication device.

FIG. 5 <Please go through and correct as above> illustrates a second exemplary embodiment of a communication device 200 of a second exemplary embodiment. The communication device 200 includes a case 10, a circuit board 20, a camera mechanism 30, an antenna mechanism 40, and a wireless communication mechanism 50. The circuit board 20, the camera mechanism 30, the antenna mechanism 40, and the wireless communication mechanism 50 are positioned in the case 10. The camera mechanism 30 and the wireless communication mechanism 50 are arranged on and electrically connected to the circuit board 20. The camera mechanism 30 is partly exposed from the case 10. The communication device 100 can be a portable electronic such as a mobile phone or a tablet. In one exemplary embodiment, the communication device 100 is a mobile phone.

The case 10 is substantially rectangular. The case 10 includes an upper shell 11 and a lower shell 12. The upper shell 11 clamps and mounts to the lower shell 12. The upper shell 11 and the lower shell 12 joining together to form an enclosed space. The circuit board 20, the camera mechanism 30, the antenna mechanism 40, and the wireless communication mechanism 50 are positioned in the enclosed space. At least one first opening 123 is defined in the lower shell 12. In one exemplary embodiment, there are two first openings 123. In one exemplary embodiment, the case 10 forms a body of the communication device 100. The upper shell 11 can be a transparent cover plate. The lower shell 12 can be a back plate of the communication device 200. The upper shell 11 and the lower shell 12 can be mounted together by screws. The communication device 100 can further include other elements for operation of the communication device, such as a processor, a memory, a battery, a speaker, and the like.

The circuit board 20 is substantially a flat plate. The circuit board 20 provides electrical signals to the camera mechanism 30, the antenna mechanism 40, and the wireless communication mechanism 50.

The camera mechanism 30 is arranged on the circuit board 20 and is electrically connected to the circuit board 20. The camera mechanism 30 includes a metal shielding 310 and a camera module 320.

The metal shielding 310 is arranged on the circuit board 20 and covers the camera module 320 to shield against electromagnetic radiation produced from the camera module 320. In one exemplary embodiment, the metal shielding 310 includes a first surface 312 and a plurality of side surfaces 314. The first surface 312 and the side surfaces 314 of the metal shielding 310 together form a receiving space to receive the camera module 320. At least one second opening 313 is defined in the first surface 312, each second openings 313 is adjacent to one first opening 123. The plurality of side surfaces 314 perpendicularly extend from the four edges of the first surface 312. In one exemplary embodiment, two second openings 313 are defined in the first surface 312.

In one exemplary embodiment, the camera module 320 is a double lens camera module, and includes a first camera 32, a second camera 34, a first frame 35, and a second frame 36. In one exemplary embodiment, an optical axis of the first camera 32 and an optical axis of the second camera 34 are parallel to each other. The features and different modes and capabilities of the first camera 32 and the second camera 34 are similar to those described previously.

The first frame 35 and the second frame 36 are spaced from each other, and are electrically connected to a ground region of the circuit board 20. The first frame 35 receives the first camera 32. The second frame 36 receives the second camera 34. In one exemplary embodiment, the first frame 35 and the second frame 36 are made of metal. In one exemplary embodiment, at least one clamping bump (not shown) is defined on an inner surface of the first frame 35, and at least one clamping bump (not shown) is defined on an inner surface of the second frame 36. In other exemplary embodiment, the inner surface of the first frame 35 and the inner surface of the second frame 36 are substantially stepped, to support the first camera 32 and the second camera 34 in line.

The antenna mechanism 40 is planar and is arranged on the metal shielding 310. Further, the antenna mechanism 40 is arranged on the first surface 312 and at least one side surface 314. The antenna mechanism 40 is electrically connected to the ground region of the circuit board 20 through the metal shielding 310. In one exemplary embodiment, the antenna mechanism 40 is directly in contact with and electrically connected to the ground region of the circuit board 20. The antenna mechanism 40 includes a first antenna 43 and a second antenna 45 electrically connected to the first antenna 43. The first antenna 43 is arranged on the first surface 312. The second antenna 45 is arranged on one side surface 314 adjacent to the first surface 312. In one exemplary embodiment, the first antenna 43 is substantially U-shaped, and the second antenna 45 is substantially L-shaped. In other exemplary embodiments, the first antenna 43 and the second antenna 45 can be in other shapes, such as Z-shape, square shape, and so on.

The wireless communication mechanism 50 is located on the circuit board 20 and is adjacent to the camera mechanism 30. The wireless communication mechanism 50 is configured to communicate wirelessly with another communication device. In one exemplary embodiment, the wireless mechanism 50 can be a WIFI transceiver or a 4G transceiver.

The exemplary embodiments shown and described above are only examples. Many details are often found in the art such as the other features of a wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. A communication device comprising:
   a circuit board;
   a camera mechanism comprising a metal shielding and a camera module arranged on the circuit board, the metal shielding being arranged on the circuit board and covering the camera module; and
   an antenna mechanism arranged on the metal shielding and electrically connected to a ground region of the circuit board through the metal shielding;
   wherein the metal shielding includes a first surface and a plurality of side surfaces extending from edges of the first surface; the antenna mechanism is arranged on the first surface and at least one side surface.

2. The communication device of claim 1, further comprising a case, wherein the printed board, the camera mechanism, and the antenna mechanism are received in the case.

3. The communication device of claim 1, wherein at least one first opening is defined in the case, at least one second opening is defined in the metal shielding, wherein each second opening is adjacent to one first opening, wherein a portion of the camera module is exposed from the second opening and the first opening.

4. The communication device of claim 1, wherein the camera module comprises at least one frame and at least one camera positioned in the frame.

5. The communication device of claim 4, wherein the at least one frame is made of metal, and the at least one frame is electrically connected to a ground region of the circuit board.

6. The communication device of claim 4, wherein the at least one camera is a first camera and a second camera.

7. The communication device of claim 6, wherein a first cavity and a second cavity are defined in one of the at least one frame, the first camera is positioned in the first cavity, and the second camera is positioned in the second cavity.

8. The communication device of claim 6, wherein the at least one frame is a first frame and a second frame, the first frame and the second frame are spaced with each other, the first camera is positioned in the first frame, and the second camera is positioned in the second frame.

9. The communication device of claim 6, wherein both the first camera and the second camera are capable switched between a photographic mode and a video mode; when the first camera and the second camera are both in the photographic mode, the first camera and the second camera are configured to capture images, singular or multiple images; when the first camera and the second camera are both in the video mode, the first camera and the second camera are configured to record moving pictures or videos; when the first camera and the second camera each be in different modes, the first camera and the second camera are configured to capturing images and moving pictures at a same time.

10. The communication device of claim 6, wherein each of the first camera and the second camera has different focal length adjustment ranges.

11. The communication device of claim 6, wherein both of the first camera and the second camera has the same focal length adjustment ranges.

12. The communication device of claim 4, wherein an optical axis of the at least one camera is parallel to each other.

13. The communication device of claim 4, wherein at least one of the at least one camera is capable of rotating and adjusting an angle between the optical axis of the camera and the circuit board.

14. The communication device of claim 1, wherein antenna mechanism includes a first antenna and a second antenna electrically connected to the first antenna; the first antenna is arranged on the first surface, and the second antenna is arranged on one side surface adjacent to the first surface.

15. The communication device of claim 14, wherein the first antenna is substantially U-shaped, and the second antenna is substantially L-shaped.

16. The communication device of claim 1, further comprising a wireless communication mechanism located on the circuit board and adjacent to the camera mechanism.

* * * * *